United States Patent [19]

Gellert

[11] 4,046,359
[45] Sept. 6, 1977

[54] INJECTION MOLDING FILTER ASSEMBLY

[76] Inventor: Jobst Ulrich Gellert, 11 Newton Road, Brampton, Ontario, Canada

[21] Appl. No.: 687,258

[22] Filed: May 17, 1976

[30] Foreign Application Priority Data

Mar. 24, 1976 Canada .................................. 248735

[51] Int. Cl.² ........................................... B01D 35/28
[52] U.S. Cl. .................................... 259/193; 210/488; 259/4 AB; 425/199
[58] Field of Search ................... 425/245 R, 199, 197; 222/189; 210/488, 498; 259/193

[56] References Cited

U.S. PATENT DOCUMENTS

| 2,513,795 | 7/1950 | Gliss | 425/199 X |
| 3,811,659 | 5/1974 | Taylor et al. | 210/498 X |

FOREIGN PATENT DOCUMENTS

| 1,047,307 | 12/1953 | France | 210/488 |
| 505,380 | 12/1954 | Italy | 425/199 |

Primary Examiner—J. Howard Flint, Jr.
Assistant Examiner—W. R. Briggs
Attorney, Agent, or Firm—George H. Riches

[57] ABSTRACT

This invention relates to an improved injection molding filter assembly to be located in a passage between the molding machine and the mold to remove contaminants such as wood, paper, or metal from the molten plastic material or melt. The filter assembly has an upstream circular plate located adjacent a downstream circular plate and the plates are secured against relative rotation by pins passing therethrough. The upstream and downstream plates each have a number of circular openings therethrough arranged in concentric circles with each of the openings in each plate partially overlapping at least two openings in the other plate, whereby a plurality of restricted eye-shaped openings are provided through the filter assembly in the abutment plane between the two plates. The filter assembly is securely retained in mating seats in the back plate and the adjoining manifold spreader plate nozzle. The contact plane between the back plate and the manifold spreader plate extends approximately midway the height of the downstream plate of the filter assembly, whereby the filter assembly also acts as a locator to prevent relative lateral movement between the back plate and the manifold spreader plate. The filter assembly according to the invention is durable, relatively inexpensive to manufacture, has an unexpectedly low pressure drop across it and exerts a considerable homogenizing or mixing effect upon the melt flowing through it.

3 Claims, 4 Drawing Figures

4,046,359

INJECTION MOLDING FILTER ASSEMBLY

BACKGROUND OF THE INVENTION

This invention relates to injection molding and more particularly to a filter assembly through which the hot molten plastic material passes between the molding machine to the mold.

The hot molten plastic material or melt may contain contaminants such as wood, paper, cardboard, iron, string, steel or brass which may plug the orifices or gates and consequently it is necessary to filter the melt as it leaves the molding machine. In the past, various devices have been used for this purpose. Thin mesh screens located in front of orificed retaining plates have the disadvantage that the screen breaks down and itself becomes a contaminant. Other devices such as radial filters have a considerable number of parts and are accordingly costly to manufacture and replace. Some of these previous filters have been provided with purging mechanism, but these similarly have the disadvantage of being relatively costly and also are subject to malfunction. Many of the prior art filters also have the disadvantage that there is a considerable pressure drop across them, thereby necessitating that a molding machine with a higher pressure output be utilized to achieve the same pressure at the mold gate.

SUMMARY OF THE INVENTION

Accordingly, it is an object of the present invention to at least partially overcome these disadvantages by providing an improved injection molding filter assembly having a pair of adjacent plates transversely located in the melt passage with overlapping openings therethrough.

To this end, in one of its aspects, the invention provides an injection molding filter assembly to be located in a passage between a molding machine and a mold to filter pressurized melt flowing therethrough comprising a first upstream plate having a plurality of circular openings extending therethrough and a flat downstream face; a second downstream plate having a plurality of circular openings extending therethrough and a flat upstream face, the first and second plates being located transversely in said passage with the flat upstream face of the second plate abutting in an abutment plane on the flat downstream face of the first plate; and means to secure the first and second plates against relative rotation therebetween; the circular openings in the first and second plates being arranged whereby each of the openings in each plate partially overlaps with at least two openings in the other plate, whereby a plurality of eye-shaped openings are provided through the filter assembly in the abutment plane.

Further objects and advantages of the invention will appear from the following description taken together with the accompanying drawings.

DESCRIPTION OF THE PREFERRED EMBODIMENT

Figure 1:
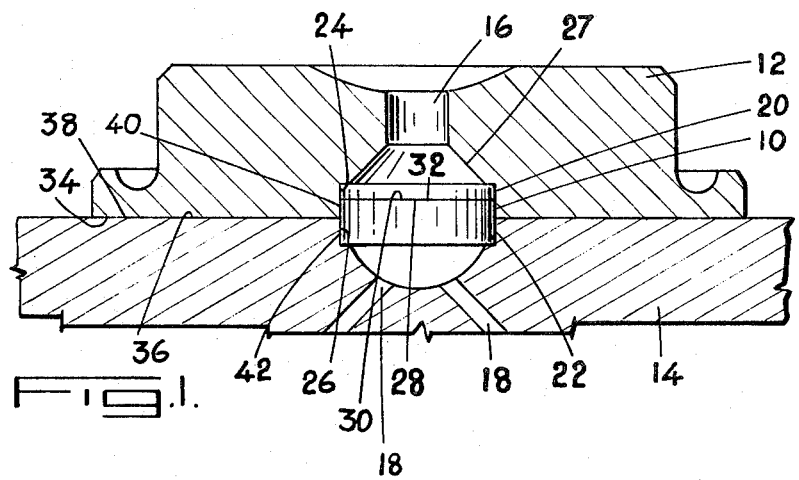
FIG. 1 is a partial sectional view showing the location of a filter assembly according to a preferred embodiment of the invention.

Reference is first made to FIG. 1 which shows a filter assembly 10 received between a seat or back plate 12 and a manifold spreader plate 14. Although a multi-cavity arrangement is illustrated and described in this embodiment the filter assembly according to the invention may be similarly located between the nozzle body and the nozzle tip in a single cavity arrangement. The back plate 12 is shaped to receive the nozzle of a molding machine (not shown) which injects hot molten plastic material or melt into passage 16. The melt flows through the filter assembly 10 and is dispersed to the various mold cavities (not shown) through hot runner passages 18. The filter assembly 10 has a circular configuration and includes a flat upstream plate 20 and a flat downstream plate 22. The filter assembly 10 is securely received in respective mating cylindrical seats 24, 26 in the back plate 12 and the manifold spreader plate 14. Melt passage 16 has a conical portion 27 leading to seat 24 to allow for dispersion of the melt over the entire area of the filter assembly 10. The upstream plate 20 has a flat downstream surface 28 which abuts on a flat upstream surface 30 of downstream plate 22 in an abutment plane 32. The back plate 12 similarly has a flat downstream surface 34 which is in bearing contact with a flat upstream surface 36 of the manifold spreader plate 12 along contact plane 38. As may be seen, the abutment plane 32 between the upstream plate 24 and downstream plate 26 is parallel to but substantially above (or upstream of) the contact plane 38 between the back plate 12 and the manifold spreader plate 14. Accordingly, the downstream plate 26 of the filter assembly 10 intersects the contact plane 38 between the back plate 12 and the manifold spreader plate 14 approximately midway of its height, whereby the receipt of an upper portion 40 of the downstream plate 22 in the seat 24 in the back plate 12 and of a lower portion 42 of the downstream plate 22 in the seat 26 in the manifold spreader plate 14 locates the back plate 12 relative to the manifold spreader plate 14 and prevents relative lateral movement between them.

Figure 2:
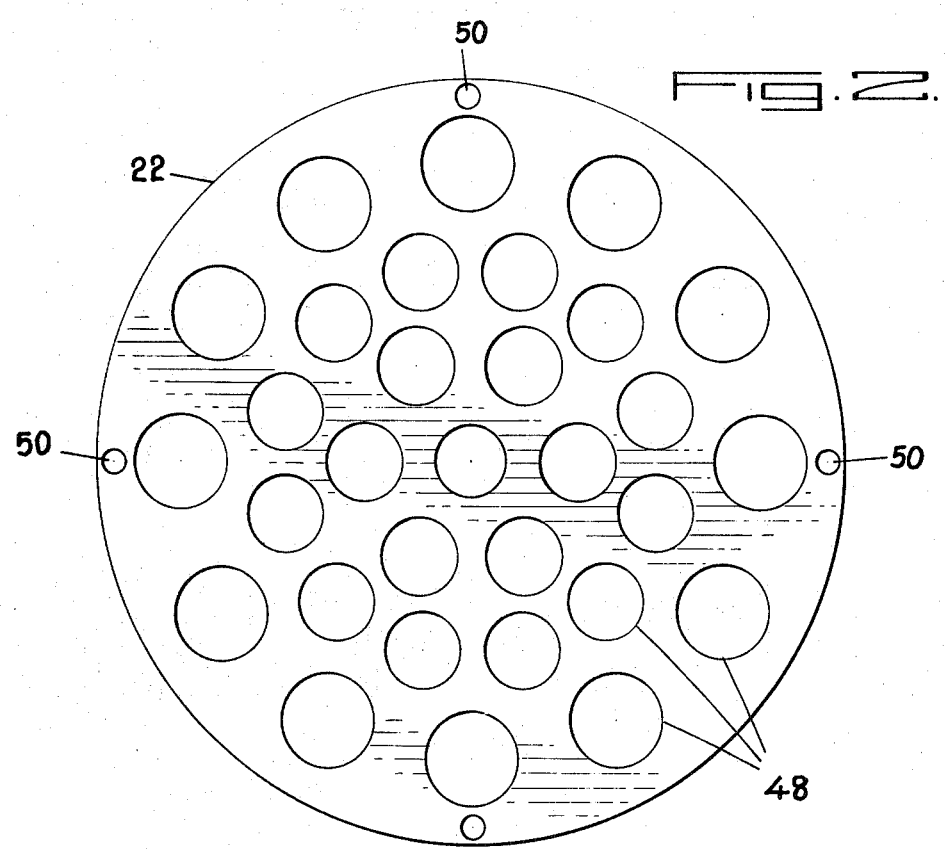
FIG. 2 is a plan view of the downstream plate of the filter assembly according to the preferred embodiment of the invention.
Figure 3:
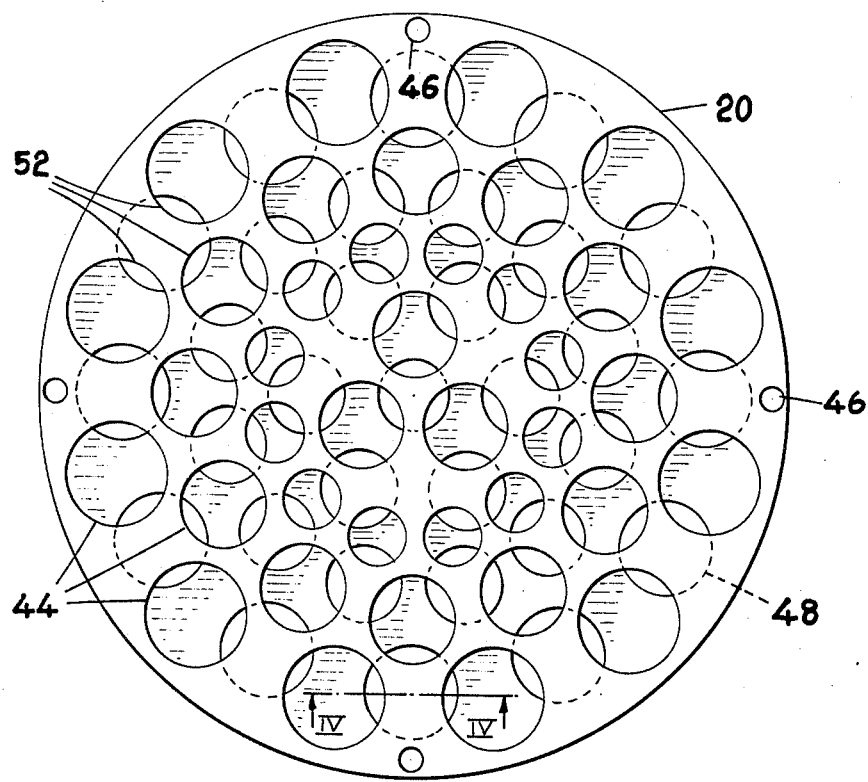
FIG. 3 is a plan view of the filter assembly according to the preferred embodiment of the invention.

FIG. 3 shows the upstream plate 20 having a number of circular openings 44 extending therethrough. As may be seen, the circular openings 44 are located in circles concentric with the upstream plate 44 and the openings of each circle are of the same size. Four pin holes 46 are shown extending through the upstream plate 44 adjacent the periphery thereof. FIG. 2 shows that the downstream plate 22 similarly has a number of circular openings 48 therethrough. These openings are also arranged in concentric circles, with the openings 48 in each circle being of equal size. The downstream plate 22 also has four pin holes 50 which are respectively in alignment with the pin holes 46 of the upstream plate 20. A pin (not shown) is received in each pair of holes to secure the upstream and downstream plates 20, 22 against relative rotation therebetween.

Figure 4:
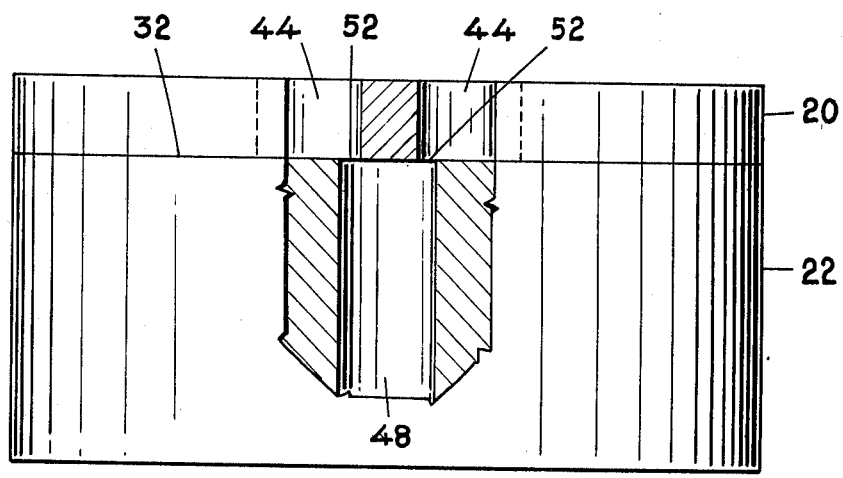
FIG. 4 is a partial sectional view along lines IV—IV in FIG. 3.

As may clearly be seen in FIGS. 3 and 4, the circular openings of the upstream plate 20 are offset from the circular openings 48 of the downstream plate 22 in an arrangement whereby each of the openings in each plate partially overlaps with at least two openings in the other plate to provide a number of eye-shaped openings 52 through the filter assembly 10 in the abutment plane 32. These eye-shaped openings 52 are distributed over the area of the filter assembly 10 and in the particular embodiment shown are approximately 0.025 inches in width. The downstream plate 22 is thicker than the upstream plate 20 in order to provide support for the upstream plate and as well to act as a lateral locater between the back plate 12 and the manifold spreader plate 14, as described above. In the embodiment shown, the two plates are formed of H13 forging steel heat-treated to approximately 4850° F while the downstream plate 22 has a thickness of approximately 0.300 inches and the upstream plate 20 a thickness of approximately 0.100 inches.

In use, the melt is injected from the molding machine into passage 16 where it flows through conical portion 27 into one of the circular openings 44 in the upstream plate 20, through the corresponding restricted eye-shaped opening 52 between the two plates, and then out of the corresponding circular opening 48 in the downstream plate 22. Large contaminants in the melt are caught by the circular openings 44 in the upstream plate 20, while smaller contaminants are caught by the restricted eye-shaped openings 52. In addition to being relatively inexpensive to manufacture and having no moving part to malfunction, it has unexpectedly been found that a filter assembly with this arrangement and shape of openings therethrough has a surprising low pressure drop across it. It has also been found that this arrangement has an improved swirling or homogenizing effect on the melt flowing through the filter assembly which improves mixing of the melt being injected into the cavities. The thicker downstream plate 22 supports the upstream plate 20 to avoid any danger of collapse particularly upon the sudden application of pressure from the molding machine, and thereby a very durable filter assembly is provided.

Although the description of the filter assembly has been given with respect to a particular embodiment, it is not to be construed in a limiting sense. Variations and modifications will occur to those skilled in the art. For a definition of the invention, reference is made to the appended claims.

I claim:

1. An injection molding filter assembly to be located in a passage between a molding machine and a mold to filter pressurized melt flowing therethrough comprising:
   a. a first upstream plate having a plurality of circular openings extending therethrough and a flat downstream face;
   b. a second downstream plate having a plurality of circular openings extending therethrough and a flat upstream face, the first and second plates being located transversely in said passage with the flat upstream face of the second plate abutting in an abutment plane on the flat downstream face of the first plate, and
   c. means to secure the first and second plates against relative rotation therebetween; the circular openings in the first and second plates being arranged in concentric circles with the openings of each circle being of equal size with each of the openings in each plate partially overlapping at least two openings in the other plate to provide a plurality of eye-shaped openings through the filter assembly in the abutment plane.

2. A filter assembly as claimed in claim 1 wherein the second plate is substantially thicker than the first plate.

3. A filter assembly as claimed in claim 1 wherein the passage extends from a back plate to a manifold spreader plate, the back plate having a flat downstream surface and the manifold spreader plate having a flat upstream surface against which the downstream surface of the back plates is in bearing contact in a contact plane, and the filter assembly is securely received in adjoining mating seats in the back plate and the manifold spreader plate, wherein the abutment plane of the filter assembly is located substantially upstream of the parallel contact plane between the back plate and the manifold spreader plate whereby the second plate of the filter assembly locates the back plate relative to the manifold spreader plate and prevents relative lateral movement between them.

* * * * *